United States Patent [19]

Nagano

[11] Patent Number: 4,840,085
[45] Date of Patent: Jun. 20, 1989

[54] PEDAL FOR A BICYCLE

[75] Inventor: Masashi Nagano, Izumi, Japan

[73] Assignee: Shimano Industrial Company Limited, Osaka, Japan

[21] Appl. No.: 206,947

[22] Filed: Jun. 13, 1988

Related U.S. Application Data

[63] Continuation of Ser. No. 3,412, Jan. 15, 1987, abandoned.

[30] Foreign Application Priority Data

Jan. 23, 1986 [JP] Japan .................. 61-8290[U]

[51] Int. Cl.⁴ .................................. G05G 1/14
[52] U.S. Cl. ........................ 74/594.4; 74/594.5
[58] Field of Search .................. 74/594.1–594.6

[56] References Cited

U.S. PATENT DOCUMENTS

| | | | |
|---|---|---|---|
| 503,206 | 8/1893 | Garford | 74/594.4 |
| 527,384 | 10/1894 | Davids | 74/594.4 |
| 580,706 | 4/1897 | Nilson | 74/594.4 |
| 599,619 | 2/1898 | Matthews | 74/594.6 |
| 611,355 | 9/1898 | Cornell | 74/594.4 |
| 618,424 | 1/1899 | Marchant | 74/594.4 |
| 630,463 | 8/1899 | Matthews | 74/594.4 |
| 637,657 | 11/1899 | Pedersen | 74/594.4 |
| 2,226,424 | 12/1940 | Bullock | 74/594.4 |
| 2,567,785 | 9/1951 | Rieger | 74/594.4 |
| 3,760,653 | 9/1973 | Hagenah | 74/594.4 |
| 3,802,292 | 4/1974 | Haberkorn et al. | 74/594.4 |
| 3,807,255 | 4/1974 | Baginski | 74/594.4 |
| 4,373,760 | 2/1983 | Durham | 74/594.6 |
| 4,398,434 | 8/1983 | Kimura | 74/594.4 |

FOREIGN PATENT DOCUMENTS

| | | | |
|---|---|---|---|
| 2121603 | 11/1972 | Fed. Rep. of Germany | 74/594.4 |
| 2346322 | 3/1975 | Fed. Rep. of Germany | 74/594.4 |
| 1054560 | 2/1954 | France | 74/594.4 |
| 486514 | 11/1953 | Italy | 74/594.4 |
| 57-46092 | 8/1982 | Japan | 74/594.4 |
| 22629 | of 1897 | United Kingdom | 74/594.4 |

*Primary Examiner*—Richard E. Moore
*Assistant Examiner*—Vinh Luong
*Attorney, Agent, or Firm*—Stevens, Davis, Miller & Mosher

[57] ABSTRACT

A pedal for a bicycle is provided in which an utmost end portion or free end of a cantilevered pedal shaft has a reduced diameter and a pair of first and second ball bearings are provided between the utmost end of the pedal shaft and the pedal body. As a result of this structure, the pedal body can be made with a smaller thickness in comparison with conventional pedal bodies which are provided at the base or fixed side of the cantilevered pedal shaft with the first ball bearing.

4 Claims, 1 Drawing Sheet

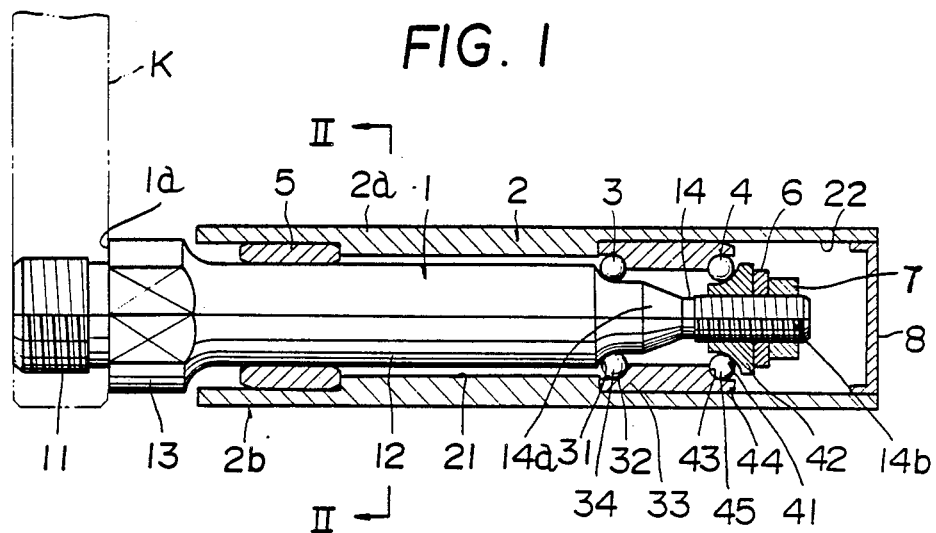
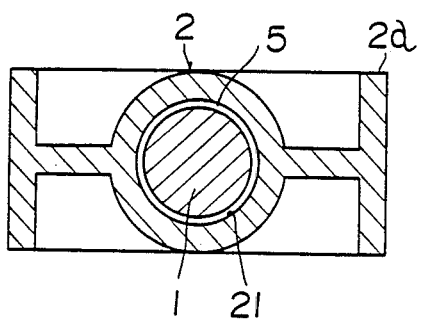
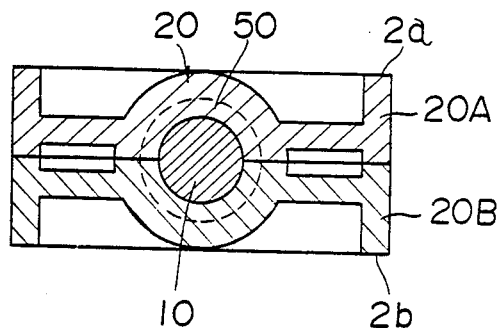
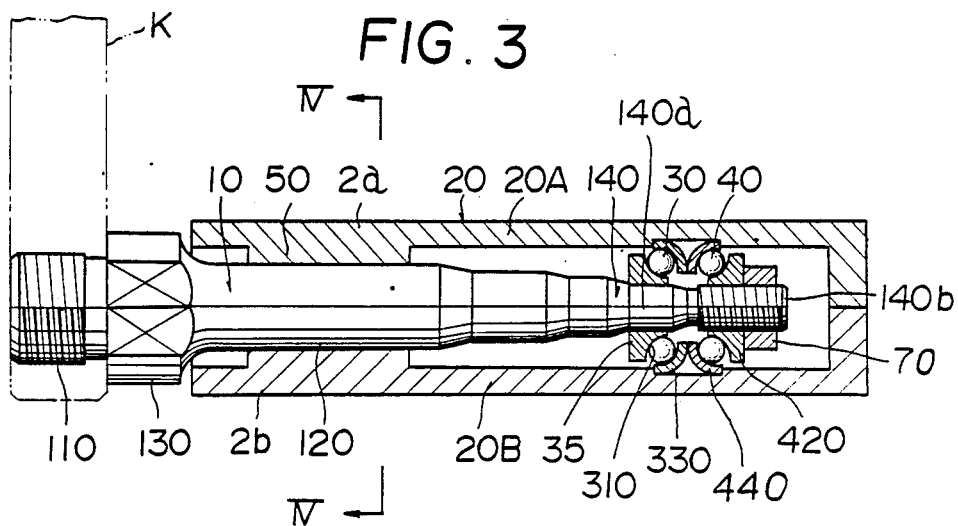

PEDAL FOR A BICYCLE

This application is a continuation of application Ser. No. 07/003,412, filed on Jan. 15, 1987 now abandoned.

FIELD OF THE INVENTION

The present invention relates to a pedal for a bicycle, and more particularly, to a pedal for a bicycle, which has a pedal body having at both sides foot bearing surfaces and supported rotatably to a pedal shaft mounted on a crank arm of the bicycle.

BACKGROUND OF THE INVENTION

Generally, a conventional bicycle pedal, as disclosed in Japanese Utility Model Laid-Open Gazette No. Sho 57-46,092, includes a pedal shaft comprising a base mounted on the crank shaft, an intermediate shaft portion extending axially outwardly from the base and an utmost end portion. The pedal is provided with a first ball bearing between the base and the intermediate shaft portion in proximity to the crank arm, and a second ball bearing between the utmost end portion and the axially outside portion of the pedal body, the pedal body being supported rotatably to the pedal shaft.

The pedal shaft is supported to the crank arm in cantilever fashion and the base is subjected to the maximum bending moment. As a result, the base must be thick in order to withstand the maximum bending moment, in other words, the maximum treading force.

The treading force acting on the pedal body, depending upon the cyclist's pedaling posture, is transmitted for the most part (about 75%) through the second ball bearing to the pedal shaft from the outside portion of the pedal body spaced apart from the crank arm. Accordingly, it is required to make the diameter of the utmost end portion at the pedal shaft large enough to bear the treading force the same as that of the base.

Therefore, the thickness of the pedal body between its upper foot bearing surface and its lower foot bearing surface is restricted by the diameter of the pedal shaft, thereby creating a problem in that it is difficult to make the thickness thereof smaller than a predetermined value.

In other words, the thickness of the pedal body depends upon the diameter of the base subjected to the maximum bending moment and the size of the ball bearing at the base side, and cannot be reduced. Hence, the road clearance between the pedal and the ground cannot be increased with the result that the angle of inclination of the bicycle relative to the ground cannot be large.

When the conventional pedal is intended to ensure a large road clearance, the foot bearing at the axially inside portion of the pedal body adjacent to the first ball bearing is sacrificed and other portions are made smaller in thickness that the axially inside portion, thereby enabling the road clearance to be increased. On the other hand, the foot bearing surface at the crank arm side is ineffective and the treading force for actual use moves away from the crank arm to an extent of the length of the axially inside portion larger in thickness, thereby creating a problem in that the cyclist's posture becomes improper with the result that the transmission efficiency of the treading force is decreased. Hence, it is impossible to fundamentally solve the above problems.

SUMMARY OF THE INVENTION

An object of the present invention is to provide a pedal for a bicycle with a pedal body having a reduced overall thickness and wherein the foot bearing surface thereof adjacent the crank arm is maintained.

In detail, the inventor has observed that in the conventional example, the pedal body is supported to the pedal shaft through the first and second ball bearings provided separately from each other at the base and utmost end of the pedal shaft, whereby it is impossible to reduce the diameter of the utmost end portion in consideration of transmission and distribution of a treading force. Instead, according to the invention, a pair of bearings are used to support the pedal shaft at the utmost end thereof to thereby enable the treading force to be dispersed and the diameter of the utmost end portion of the pedal shaft to be reduced to that extent. The present inventor has also observed that in conventional pedals, the first ball bearing provided at the base side requires the thickness of the pedal body at the base side thereof to be set in consideration not only of the diameter of the pedal shaft but also of the size of the first ball bearing, with the result that the pedal body becomes larger in thickness to that extent. Therefore, the invention is directed to provision of a pair of bearings at the utmost end portion of the pedal shaft but not at the base side thereof, thereby enabling the pedal body to be smaller in thickness as a whole.

The present invention provides a pedal for a bicycle, which has a pedal body rotatably supported to the pedal shaft mounted on the crank arm at the bicycle, the pedal body having at both its sides foot bearing surfaces. The utmost end portion of the pedal shaft is made smaller in diameter than the base of the same mounted on the crank arm and a pair of first and second ball bearings are provided between the utmost end portion and the pedal body opposite thereto, with the pedal body being supported rotatably to the smaller diameter portion of the pedal shaft.

In detail, while the diameter of the pedal shaft is made large enough to bear the maximum bending moment, the first ball bearing is disposed at the utmost end portion of the pedal shaft so as to support together with the second ball bearing the pedal body, whereby the treading force to be applied to the pedal shaft from the axially outside portion of the pedal body is distributed by the pair of ball bearings to be transmitted to the pedal shaft, thereby enabling the utmost end portion of the pedal shaft to be reduced in diameter.

Accordingly, since no bearing is provided at the base side of the pedal shaft and the utmost end portion thereof can be reduced in diameter, the axially inside portion of the pedal body can be reduced in thickness without being restricted by the ball bearing so that a thickness of the axially outside portion can be set on the basis of the thickness of the axially inside portion, whereby the pedal body has a smaller overall thickness and the road clearance can be made larger to that extent. Also, since the entire surface of the pedal body provides the foot bearing surface, the foot bearing surface can extend close to the crank arm to allow the cyclist to pedal the bicycle in a good posture, thereby improving the transmission efficiency for the treading force transmitted to the pedal shaft.

These and other objects of the invention will be more fully apparent by reference to the following description, taken in connection with the accompanying drawings.

BRIEF DESCRIPTION OF THE DRAWINGS

FIG. 1 is a longitudinal sectional front view of an embodiment of a pedal for the bicycle of the invention;

FIG. 2 is a sectional view taken on line II—II in FIG. 1;

FIG. 3 is a sectional view of a modified embodiment of the invention, corresponding to FIG. 1; and FIG. 4 is a sectional view taken on line IV—IV in FIG. 3.

DETAILED DESCRIPTION OF THE PREFERRED EMBODIMENTS

Referring to FIG. 1, reference numeral 1 designates a pedal shaft mounted on a free end of a crank arm K at a crank for the bicycle, and reference numeral 2 designates a pedal body supported rotatably to pedal shaft 1 and having at both surfaces foot bearing surfaces 2a and 2b respectively. Pedal shaft 1 comprises a base 11 having at its outer periphery a screw thread, an intermediate shaft portion 12 extending axially outwardly from the base k11, a rotatably operating portion 13 having an angular cross-section and provided between the base 11 and the intermediate shaft portion 12, and an utmost end portion 14 positioned axially outwardly of the intermediate shaft portion 12.

In an embodiment of the pedal of the invention shown in FIGS. 1 and 2, the utmost end portion 14 at the pedal shaft 1 is made smaller in diameter than the base 11 mounted on the crank arm K and a pair of first and second ball bearings 3 and 4 are provided between the utmost end portion 14 and the inner periphery of the pedal body 2 opposite thereto.

In the above-described construction, the first and second ball bearings 3 and 4 are subjected to the treading force for pedalling the bicycle, the treading force being distributed to the ball bearings 3 and 4 and then transmitted to the pedal shaft 1. As a result, the diameter of the utmost end portion 14 can be made smaller than that of the pedal shaft at the conventional pedal which is provided at the base 11 side with the first ball bearing 3, in other words, which is provided at the utmost end portion 14 with the second ball bearing 4 only.

Also, the diameter of the utmost end portion 14 is made smaller within a range of bearing the maximum bending moment used by the treading force transmitted to the same through the first and second ball bearings 3 and 4. Referring to FIG. 1, a shaft portion in continuation of the intermediate shaft portion 12 is provided with an inner ball race 31 for the first ball bearing 3 and is gently tapered to form a tapered portion 14a. The utmost end portion 14 in continuation of the tapered shaft portion 14a is made further smaller in diameter and has a screw thread 14b which screws with a ball holder 42 having an outer ball race 41 for the second ball bearing 4.

The first ball bearing means 3 comprises the inner ball race 31, an outer ring 33 having an outer ball race 32 opposite to the inner ball race 31, and a number of balls 34 interposed between the inner ball race 31 and the outer ball race 32. The second ball bearing means 4 comprises the ball holder 42, an outer ring 44 having an outer ball race 43 opposite to the inner ball race 41 at the ball holder 42, and a number of balls 45 interposed between the ball races 41 and 43, the outer rings 33 and 44 shown in FIG. 1 being integral with each other. The ball holder 42 can be adjusted with respect to its screwing position so that the pedal body 2 fixed by the integral outer rings 33 and 44 press-fitted to the pedal body 2 can be adjusted with respect to the rotation thereof. In addition, the first and second ball bearings 3 and 4 are disposed axially inwardly and outwardly of the position spaced apart by about 60 mm from the inner edge 1a of the base 11 of the pedal shaft 1, and in proximity to each other. The central position between both the ball bearings 3 and 4, and an interval therebetween, are not particularly defined. The first ball bearing 3, however, is preferably disposed toward the utmost end beyond the midway position of the entire axial length of the pedal shaft 1 except for the base 11. Also, the ball holder 42 and outer rings 33 and 44 are formed of metal and the ball races 32, 41 and 53 thereof are sintered.

The pedal body 2 is made from light metal, such as aluminum, and forms entirely on both the surfaces thereof the foot bearing surfaces 2a and 2b, respectively. At the center of the pedal body 2 in the longitudinal direction of the bicycle are provided (1) a bore 21 for receiving therein the intermediate shaft portion 12 at the pedal shaft 1 and (2) a bearing bore 22 in continuation of the bore 21 through a shoulder, so that the integral outer rings 33 and 44 are press-fitted into the bearing bore 22, thereby supporting the pedal body 2 rotatably to the smaller diameter portion 14. In addition, the pedal body 2 is restrained by the first ball bearing 3 from moving axially inwardly with respect to the pedal shaft 1 and by the econd ball bearing 4 from moving axially outwardly with respect to the same.

Incidentally, the pedal shown in FIG. 1 is provided in the receiving bore 21 with a bush 5 having a low friction coefficient. The bush 5 is not indispensable, but is used to prevent the pedal body 2 from lowering its rotational efficiency, because of avoiding direct contact of the inner surface of the pedal body 2 with the outer periphery of the pedal shaft 1.

The bush 5 may be integral with the pedal body 2, molded of light metal or synthetic resin, or may be provided at the inner periphery with one or more annular oil sump grooves into which grease is filled so as to prevent rain water from entering each ball bearing 3 or 4 within the receiving bore through a gap between the edge of pedal body 2 and the pedal shaft 1.

In addition, in FIG. 1, reference numerals 6 and 7 designate lock nuts screwing with the utmost end portion 14b of pedal shaft 1, and reference numeral 8 designates a cap mounted detachably onto an opening of the bearing bore 22.

The pedal for the bicycle of the invention constructed as described above is screwed at the base 11 of pedal shaft 1 with the free end of the crank arm K at the bicycle and built therein. The treading force by the cyclist is transmitted from the pedal body 2 to the crank arm K through the first and second ball bearings 3 and 4, the utmost end 14 at the pedal shaft 1, and the base 11 thereof.

Since the pedal body 2 is supported rotatably to the smaller diameter utmost end portion 14 of pedal shaft 1 through the first and second ball bearings 3 and 4, the foot bearing surfaces 2a and 2b at the axially inside portions of the pedal body 2 can approach the axis of the pedal shaft 1 without being restricted by the ball bearing. Hence, the pedal body 2 has a reduced thickness at the axially inside portion at the crank arm side in comparison with conventional pedal bodies and the thickness of the axially outside portion of the pedal body 2 is set on the basis of the thickness of the axially inside portion, whereby the pedal body 2 as a whole is made smaller in thickness. Hence, when the bicycle is running, is turned sharply or is operated on a sloping surface, such as a racing track, the road clearance is made larger, thereby enabling an angle of inclination of the bicycle against the ground to be made larger.

The respective foot bearing surfaces 2a and 2b at the pedal body 2, which are made entirely flat and parallel to the axis of the pedal shaft 1, can extend close to crank arm K more closely than those of conventional pedals. Hence, the cyclist can take a good posture in pedalling the bicycle, thereby improving the transmission efficiency of the treading transmitted to the pedal shaft 1.

The pedal shaft 1, which is smaller in diameter at the utmost end portion 14, supports the pedal body 2 through the pair of ball bearings 3 and 4, thereby ensuring the strength needed for the pedal body 1.

Alternatively, a pedal body 20 may be formed of synthetic resin and divided into halves at both sides on the line passing the axis of pedal shaft 1 as shown in FIGS. 3 and 4, with the separate halves 20A and 20B being bonded by a bonding means, such as welding. Thus, a pedal shaft 10 and first and second ball bearings 30 and 40 at an utmost end portion of the pedal shaft 10, are made as a unit so as to support the pedal body 20, whereby a ball holder 420 screwable with a screw thread 140b at the utmost end portion 140 can easily adjust the rotational efficiency of pedal body 20 and also the ball bearings 30 and 40 can be easily built-in.

In the modified embodiment shown in FIGS. 3 and 4, the utmost end portion 140 of the pedal shaft 10 is made stepwise smaller in diameter, and an inner ring 35 having an inner ball race 310 is fitted onto the outer periphery of a base side portion of the smallest diameter shaft portion 140a. Ball holder 420 screws with a screw thread 140b provided at the outer periphery of the utmost end portion 140, and outer rings 330 and 440 are separate from each other. In addition, a bush 50 is integral with respective halves 20A and 20B of the pedal body 20.

In this embodiment, the ball race 310 is not provided directly at the pedal shaft 10, whereby there is no need for sintering thereof, with the result that the manufacturing costs are lowered to that extent and there is no risk that pedal shaft 10 will be broken due to its being sintered.

In addition, in FIGS. 3 and 4, reference number 110 designates a base at the pedal shaft 10, and reference numeral 120 designates an intermediate shaft portion thereof. Reference numeral 130 designates a rotatably operating portion of the pedal shaft. These elements are the same as those in the embodiment in FIGS. 1 and 2. Also, the pedal body 20 in the modified embodiment in FIGS. 3 and 4 may be formed of light metal other than synthetic resin and divided into halves, so that the abutting surfaces may be bonded by bonding means, such as adhesive or set screws. Also, the ball holder 420 and inner ring 35 may be positioned reversely to each other.

As seen from the above, the pedal body 2 or 20 is supported on the utmost end portion 14 or 140 of smaller diameter through the first ball bearing 3 or 30 and second ball bearing 4 or 40 interposed between the pedal body 2 or 20 and the utmost end portion 14 or 140. As a result, pedal body 2 or 20 can have a reduced thickness without being restricted by the first ball bearing 3 or 30 and setting the thickness of the axially outside portion of the pedal body. Hence, the entire pedal body can have a thickness which is reduced relative to the conventional pedal, with the result that a larger road clearance is ensured.

Also, the foot bearing surfaces can extend close to the crank arm because they are formed at the pedal body surfaces at the crank arm side, whereby the cyclist can maintain a good posture for pedaling the bicycle to improve the transmission efficiency of the treading force.

The first and second ball bearings at the utmost end portion of the pedal shaft can ensure a larger area for the ball race, thereby enabling local wear to be reduced in comparison with the conventional pedal provided at the base side with the first ball bearing. As a result, the durability of the ball bearing is improved.

Furthermore, the treading force to be transmitted to the pedal shaft is distributed by the two ball bearings, thereby reducing the load applied to each bearing in comparison with the conventional pedal. Hence, the radii of the ball race and of each ball can be made smaller to reduce occurrences of backlash at the bearing caused by a rough ball race surface thereof. Hence, the ball bearing also can be small, thus enabling further reduction in the pedal body thickness.

Although several embodiments have been described, they are merely exemplary of the invention, the invention being defined solely by the appended claims.

I claim:

1. A bicycle pedal to be supported to a crank arm of a bicycle, comprising:
    (a) a pedal shaft including a base adapted to be mounted on said crank arm, an utmost end portion, and an intermediate shaft portion between said base and said utmost end portion, said utmost end portion having a smaller diameter than a diameter of said base,
    (b) a pedal body suported rotatably relative to said pedal shaft, said pedal body having a first foot bearing surface on one side thereof and a second foot bearing surface at another side thereof which are positioned radially outwardly of said intermediate shaft portion and said outmost end portion,
    (c) a ball bearing means for supporting said pedal body rotatably relative to said pedal shaft and comprising a first ball bearing means and a second ball bearing means provided between said pedal body and said utmost end portion at a position located at said utmost end portion spaced from an axial center position of a portion of said pedal shaft which includes said intermediate shaft portion and said utmost end portion, said first ball bearing means and said second ball bearing means being axially spaced apart and located at a position adjacent a longitudinal utmost end portion of said pedal body; and
    (d) a bush formed of light metal or synthetic resin and provided between a longitudinal root end portion of said pedal body and said intermediate shaft portion at a side of said intermediate shaft portion adjacent said base, said bush comprising means for enabling said pedal body at a side thereof adjacent said base to be supported through said bush which in turn is supported by said pedal shaft when said pedal body bends radially of said pedal shaft, wherein a gap is defined between said pedal body and said intermediate shaft portion, said gap enabling said pedal body to rotate freely relative to said pedal shaft during use without contacting said pedal shaft when said pedal body bends radially of said pedal shaft responsive to a treading force applied to one of said first foot bearing surface and said second foot bearing surface, said bush having a length such that it does not extend into said gap.

2. A bicycle pedal according to claim 1, wherein said pedal shaft includes a connecting portion between said intermediate shaft portion and said utmost end portion, said connecting portion being in continuation of said intermediate shaft portion and including a ball race for said first ball bearing means.

3. A pedal for a bicycle according to claim 1, wherein said pedal body comprises a first body having said first foot bearing surface and a second body having said second foot bearing surface, both said first body and said second body having opposing surfaces bonded with each other and extending axially of the pedal shaft, said pedal further comprising a tubular ring means having a pair of ball races engaging with said first ball bearing means and said second ball bearing means, said ring means being rotationally supported on said pedal shaft through said first ball bearing means and said second ball bearing means, and said ring means being fitted between said first body and said second body.

4. A pedal for a bicycle according to claim 1, wherein said bush is located (i) entirely between said pedal body and said pedal shaft and (ii) only at said side of said intermediate shaft portion adjacent said base.

* * * * *